Jan. 22, 1963 H. F. PARKER ET AL 3,074,356
CONVEYOR TROLLEY AND TRACK THEREOF
Filed Sept. 21, 1959 2 Sheets-Sheet 1
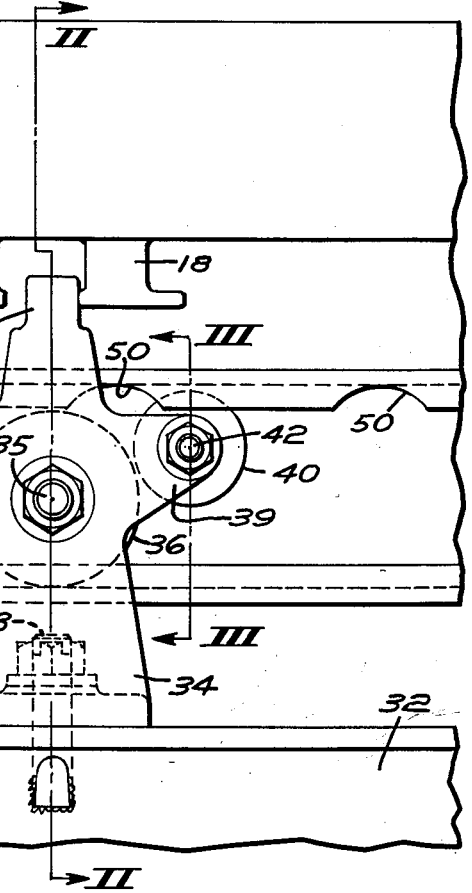
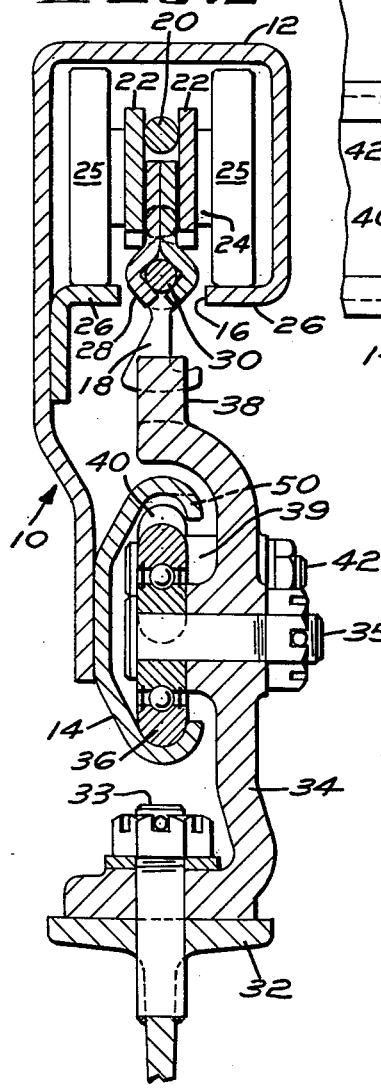
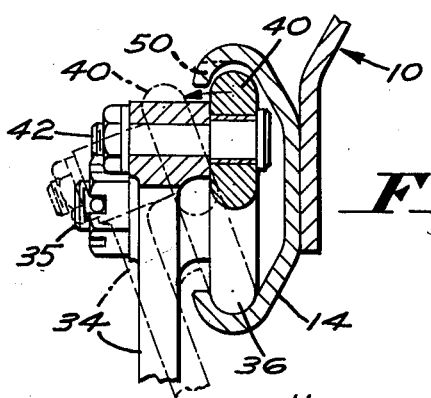
INVENTORS:
HUMPHREY F. PARKER
ERFORD E. ROBINS
FRANKLIN O. CHURCH
BY: Beau, Brooke, Buckley & Beau,
ATTORNEYS.

Jan. 22, 1963  H. F. PARKER ET AL  3,074,356
CONVEYOR TROLLEY AND TRACK THEREOF
Filed Sept. 21, 1959  2 Sheets-Sheet 2
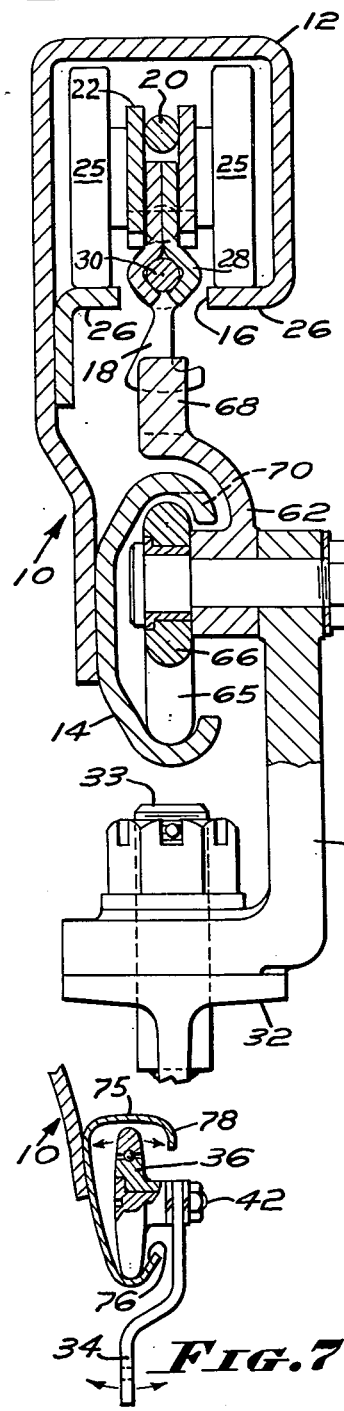
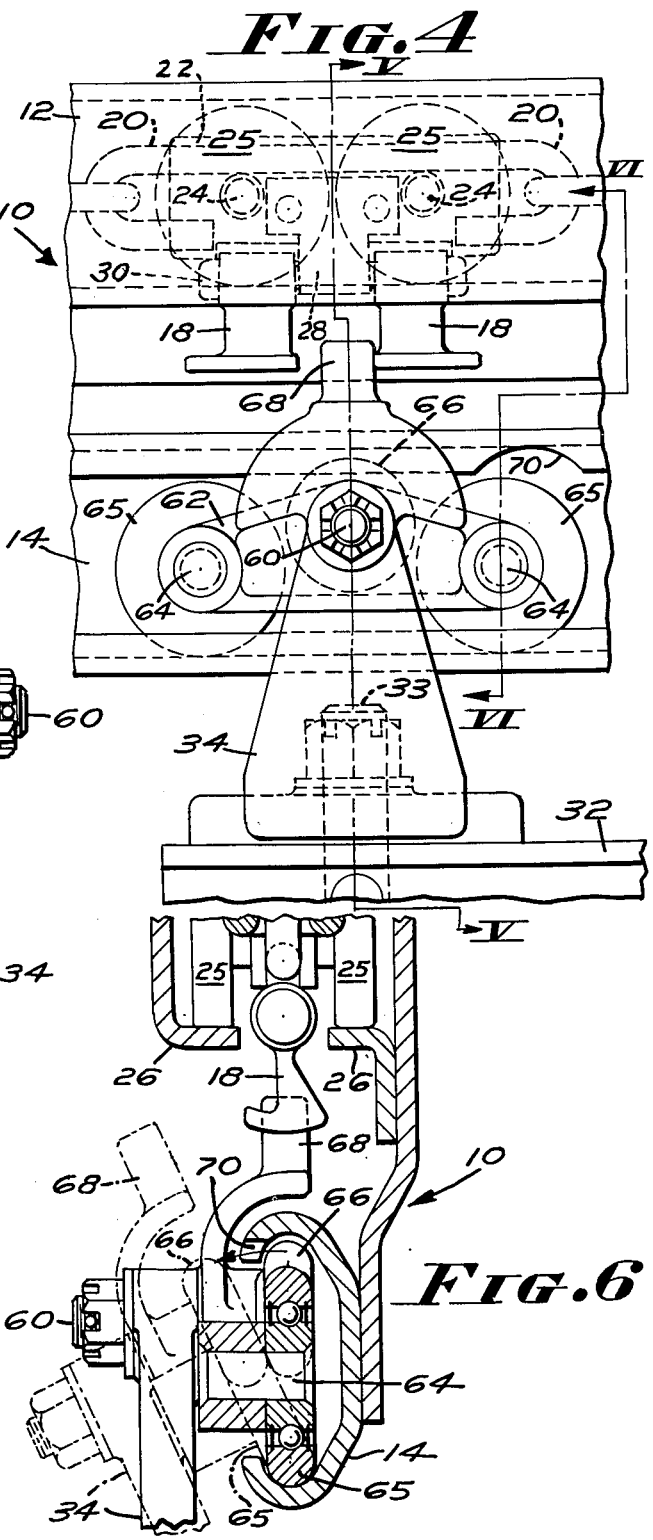

United States Patent Office 3,074,356
Patented Jan. 22, 1963

3,074,356
CONVEYOR TROLLEY AND TRACK THEREOF
Humphrey F. Parker, Buffalo, Erford E. Robins, North Tonawanda, and Franklin O. Church, Buffalo, N.Y., assignors to Columbus McKinnon Corporation, a corporation of New York
Filed Sept. 21, 1959, Ser. No. 841,388
1 Claim. (Cl. 104—172)

This invention relates to trolley conveyor systems, and more particularly to improvements in the trolley conveyor trackways and load carrying trolleys of such systems.

The present invention has specific reference to that type of trolley conveyor system wherein a power chain or the like travels in one trackway and the load carrying trolleys travel in a parallel trackway. In such systems it is usually desirable, in order to provide the system with the necessary degree of operational versatility, to provide arrangements to permit alternate mounting and dismounting of pluralities of load trolleys relative to the trackway system, at positions therealong other than at the conventionally provided open end portions of the trackway.

It is an object of the present invention to provide an improved load carrying trolley arrangement in a powered trackway system, whereby the load trolleys of the system may be readily mounted and dismounted relative to the trackways at any desired positions therealong.

Other objects and advantages of the invention will appear from the specification hereinafter, wherein exemplary forms of the invention are illustrated by means of the accompanying drawings wherein:

FIG. 1 is a fragmentary side elevational view of a powerized trolley conveyor system, illustrating one form of load trolley and provision for alternately mounting and dismounting the latter from the associated trackway, in accordance with the invention;

FIG. 2 is a sectional view, on slightly enlarged scale, taken along line II—II of FIG. 1;

FIG. 3 is a fragmentary sectional view, on enlarged scale, taken along line III—III of FIG. 1;

FIG. 4 is a view corresponding to FIG. 1, but of a modified form of load trolley and mounting-dismounting arrangement;

FIG. 5 is a sectional view, on slightly enlarged scale, taken on line V—V of FIG. 4;

FIG. 6 is a fragmentary sectional view, on enlarged scale, taken along line VI—VI of FIG. 4; and FIG. 7 is a view corresponding to FIG. 3, but showing a modified form of the trolley track construction.

As shown in FIGS. 1, 2, 3, the invention is embodied in a conveyor system including a trackway designated generally at 10 comprising a bent sheet metal fabrication having an upper power chain accommodating trackway portion 12 and a lower load trolley accommodating portion 14. The upper trackway portion is of box-sectioned form, the bottom surface of which is longitudinally slotted as indicated at 16 to accommodate in sliding relation therethrough the depending dogs 18—18 of the power chain unit which is supported within the trackway section 12. The power chain unit comprises a strand of linked chain elements 20 (FIG. 2) to which at intervals therealong are attached support roller carriages as shown for example in FIG. 2. Thus, each carriage may comprise a pair of frame plates 22—22 supporting transversely thereof axle means 24 which in turn mounts at its opposite ends paired rollers 25, 25. The parts are so dimensioned that the rollers 25, 25 run upon the bottom flange portions 26, 26 of the trackway device 12; and the frame plates 22, 22 support therebetween a bracket device 28 which in turn carries a pivot pin 30 upon which the dogs 18—18 are mounted to suspend therefrom. Thus, it will be appreciated that upon driving of the power chain 20 the power supply dogs 18—18 will be carried along therewith in directions longitudinally of the trackway 12 to intermittently pick up and drive load carrying trolleys through the trackway system as will be explained hereinafter.

As shown in FIGS. 2—3, the load trolley trackway component comprises a C-sectioned rail device running parallel to the trackway portion 12, and in this case the load trolleys are illustrated to each comprise a horizontal bar portion 32 suspended at its opposite ends by means of bolts 33 from trolley brackets 34 which extend upwardly therefrom and are carried by axle bolts 35. In turn the axle bolts each mount a trolley carriage roller 36 which is preferably of the ball bearing type as shown in FIG. 2. The bracket members 34 extend upwardly beyond the axle bolts 35 and terminate in a vertically standing lug 38 which is thereby arranged to be disposed in the path of the power chain driving dogs 18—18 when the system is in operation.

The dogs 18—18 are provided with oppositely beveled outer end surfaces which thereby operate to permit the dogs to cam upon their pivotal connections at 30 in such manner that whenever the power chain approaches a standing trolley, the leading dog 18 when coming into contact with the lug 38 will be cammed thereby sidewise so as to clear the lug 38. However, when the trailing dog 18 comes into registry of the lug 38, its leading end portion is flatwise disposed, and therefore the trailing dog 18 picks up the load trolley and drives it forwardly in the direction of travel of the power chain. The leading dog 18 meanwhile swings back into aligned position with the lug 38, and thenceforth functions to hold back the load trolley against any tendency thereof to overrun the power chain; such as for example whenever the trolley system negotiates a downhill section of trackway.

The trolley brackets 34 also include laterally extending ear portions 39—39 (FIG. 1) which in turn support stabilizing rollers 40—40 by means of axle bolts 42—42. The parts are so arranged that the rollers 40—40 ride against the ceiling of the track section 14 and at opposite sides of the vertical plane of the main trolley roller 36. Thus, the rollers 40—40 tend to stabilize the trolley carriage against any tilting tendencies in response to the driving forces of the dogs 18 against the lug 38. To permit the load trolleys of the device to be alternately mounted and dismounted from the trackway system at any desired position therealong, the upper outside flange portion of the track member 14 is notched as indicated at 50—50 in dual arrangements having the same relative spacings as the paired stabilizing rollers 40—40 of the load trolley carriage. At the same time, it will be seen that the load support roller 36 is of a diameter to clear this upper flange portion of member 14.

Thus, it will be appreciated that whereas the load trolleys normally tend to ride in the trackway device 14 in vertically hanging attitudes as shown in solid lines of FIG. 3, whenever it is desired to remove a trolley from the system it may be forcibly swung to the inclined position thereof shown by broken lines in FIG. 3 until such time as the top rims of the rollers 40—40 clear the top section of the track member 14. The trolley carriage may then be lifted away from the trackway system; and subsequent mountings thereof may of course be accomplished by simply reversing the operation. It is however a particular feature of the present invention that by virtue of the specific trackway and load trolley construction as shown herein, the load trolleys always tend to ride in substantially vertical attitudes as illustrated in FIG. 2, so that there is no tendency of the load trolleys to become displaced from the trackway system during normal operation of the mechanism. On the other hand when the load trolleys are empty, and it is desired to mount or dismount them from the trackway, it is relatively easy to fulcrum them to the inclined positions of the carriages as shown by broken lines in FIG. 3, whereupon the stabilizer rollers move through the notched sections 50—50 of the track member 14, to acquire the desired result.

FIGS. 4–6 inclusive illustrate embodiment of the invention in connection with a load trolley arrangement wherein the load carrying bracket 34 simply mounts at its upper end a machine screw or bolt 60. The bolt 60 in turn mounts a cross arm or beam 62 carrying at its opposite ends, by means of axles 64—64, a pair of trolley support rollers 65, 65; the rollers 65 being preferably of the ball bearing type as shown in FIG. 6. Thus the rollers 65—65 are disposed to run within the bottom level of the trackway portion 14. The bolt 60 also mounts at its inner end a guide or stabilizing roller 66 which is thereby disposed to engage within the upper level of the track member 14 for stabilizing the trolley carriage against unintended lateral and/or longitudinal tiltings under operative conditions. The cross beam member 62 also includes a centrally disposed vertically extending lug portion 68 corresponding to the lug 38 of the construction shown in FIGS. 1–3, for power chain engaging as explained hereinabove.

To facilitate independent mounting and dismounting of load trolleys relative to the trackway system as explained hereinabove, the upper outer flange portion of the track member 14 is provided periodically therealong with notched-out portions 70 shaped to complement the upper rim portions of the stabilizing roller 66; whereby it will be appreciated that the load carriages of FIGS. 4–6 may be mounted and/or dismounted relative to the trackway system by angularly displacing them as indicated by the broken lines showing in FIG. 6, while bringing the guide rollers 66 into register with the notched portions 70 of the trackway member.

FIG. 7 illustrates a trolley track construction somewhat similar to that of FIG. 3, except that in FIG. 7 the top portion 75 of the generally C-shaped track member is flattened and widened so as to permit the load trolley to sway somewhat during the conveyor operation without excessive scuffing of the trolley wheels against the track side walls. For this purpose the wheel rims are preferably crowned as shown in the drawing to a radius substantially shorter than the radius of the inside curve at the bottom of the track rail, as indicated at 76. Thus the trolley is free to sway laterally, within limits, while being at the same time properly guided and prevented from "jumping" the track by means of the overhanging flange portion 78. However the latter may be notched at selected positions along the trackway other than at the track ends for mounting and dismounting purposes as explained hereinabove.

The construction of FIG. 7 is particularly advantageous in connection with horizontally curving track sections wherein the trolleys run at substantial speeds whereby their loads tend to sway outwardly while negotiating the track turn. This construction avoids the imposition of secondary loads on the trolley roller and bearing system and scuffing of the roller and track rail.

The invention contemplates of course application to other forms of trolley support means whereby the device running in the trackway may in any case be easily mounted and dismounted therefrom simply by tilting the trolley so that the top portion of the load support means may pass through the notch or notches provided in the overhanging flange portion of the trackway, as explained hereinabove.

Thus, it will of course be appreciated that whereas only a few forms of the invention have been illustrated and described in detail hereinabove, it will be understood that various changes may be made therein without departing from the spirit of the invention or the scope of the following claim.

We claim:

In a trolley conveyor system, the combination including, a trackway device having drive means and a trolley guide track, said drive means being disposed in vertically spaced relation above said guide track and including a pair of depending, longitudinally spaced drive dogs, a load trolley carriage adapted for mounting upon the trolley track member of said system, said load trolley carriage including a load suspension bracket extending vertically and mounting thereon load support means projecting laterally from one side thereof and comprising at least one roller adapted to run in said trolley track, said bracket including an upwardly extending lug portion disposed in traveling registry between said driving dogs of said power chain device, a second roller mounted on said bracket substantially coplanar with the first mentioned roller but extending vertically thereabove, said load trolley track including an overhanging top flange portion extending above said second roller and curving downwardly thereover to normally prevent the load trolley carriage from tipping sidewise, said flange portion having at spaced intervals therealong cut-out portions complementing the shape of the top of said second roller, whereby said load trolley may be alternately mounted and dismounted relative to the trackway by angular displacements thereof sufficient to cause the top portion of said second roller to pass through the cut-out portion of said track member and to simultaneously move said lug portion laterally outwardly from between said drive dogs.

References Cited in the file of this patent
UNITED STATES PATENTS

| | | |
|---|---|---|
| 1,380,668 | Martin | June 7, 1921 |
| 1,547,707 | Willard | July 28, 1925 |
| 2,482,855 | Lloyd | Sept. 27, 1949 |
| 2,853,955 | Bishop et al. | Sept. 30, 1958 |